Nov. 13, 1923.

O. POEBING 1,474,086

REGULATING WATER POWER STATIONS

Filed April 4, 1922     4 Sheets-Sheet 1

Inventor:
Oskar Poebing
By Henry Orth
atty.

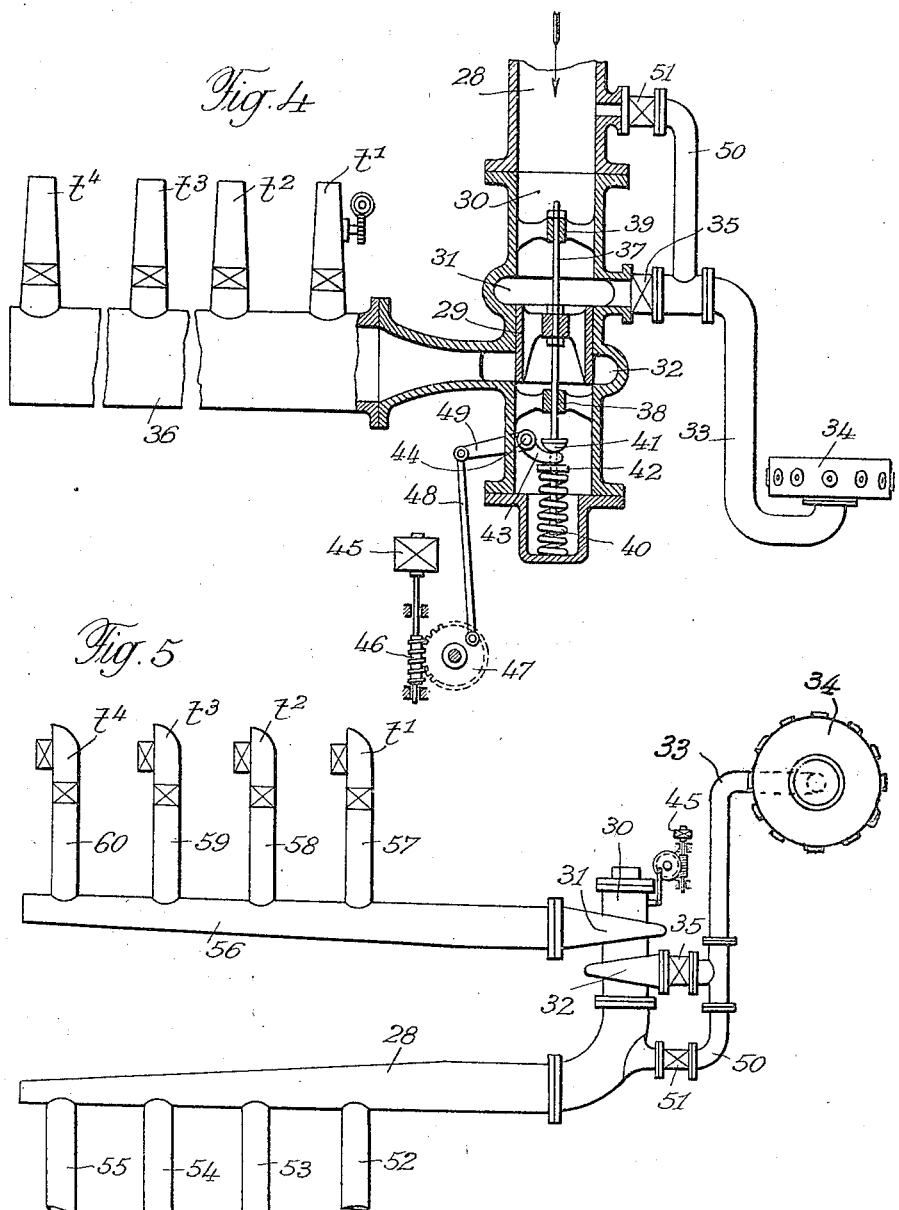

Nov. 13, 1923.  
O. POEBING  
1,474,086  
REGULATING WATER POWER STATIONS  
Filed April 4, 1922    4 Sheets-Sheet 3

Inventor:
Oskar Poebing.
By
Atty

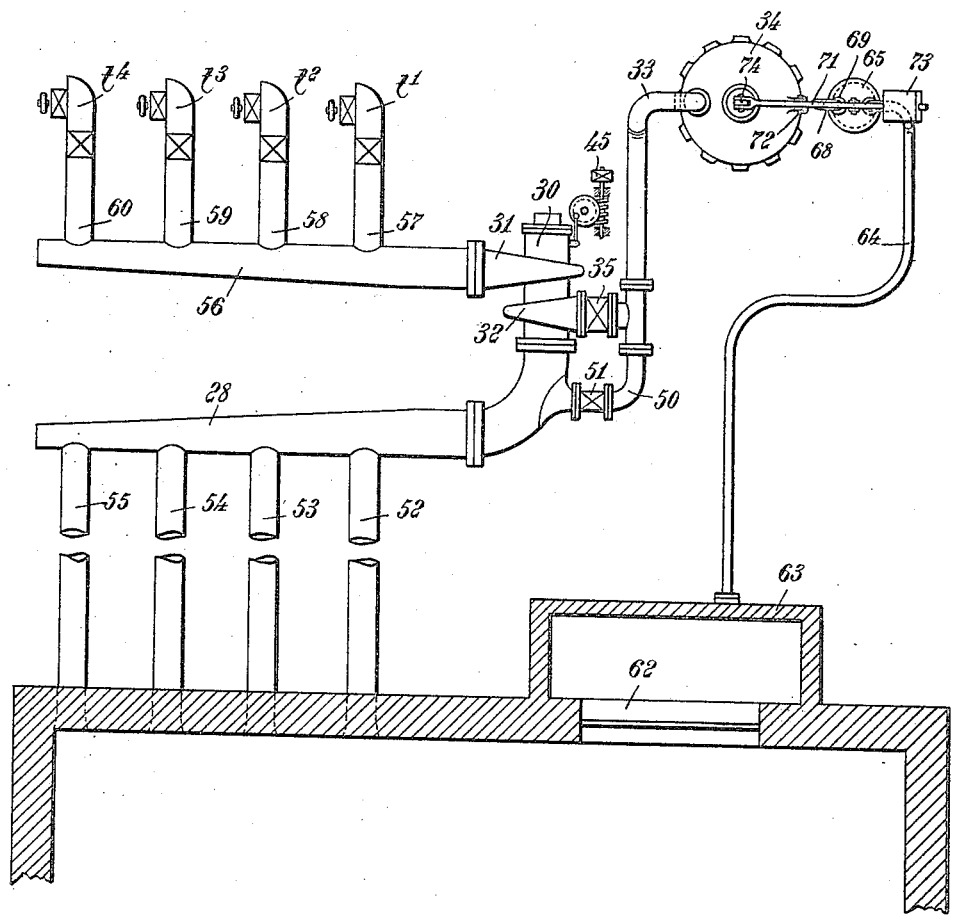

Patented Nov. 13, 1923.

1,474,086

UNITED STATES PATENT OFFICE.

OSKAR POEBING, OF MUNICH, GERMANY.

REGULATING WATER-POWER STATIONS.

Application filed April 4, 1922. Serial No. 549,548.

*To all whom it may concern:*

Be it known that I, OSKAR POEBING, a citizen of the Republic of Germany, residing at Munich, Germany, have invented certain new and useful Improvements in Regulating Water-Power Stations, of which the following is a specification, reference being had therein to the accompanying drawing.

The present invention relates to improvements in water-power-stations and particularly to methods and devices for regulating the water passage through water-power-stations provided with closed water supply conduits.

In known water power stations when there is a change of load on the turbines, or water wheels, the turbine blades are adjusted, or the area of the nozzles changed in accordance with the new conditions, and this is done in some cases with a simultaneous diversion of some of the water from the turbine.

All these known regulation methods for turbines having supply conduits, present the feature that in the supply conduits and in the turbines no change of pressure occurs, the turbines work always under the same pressure or head, whether they are under great or small load. In order to insure a constant head separate relief devices adapted to lead off part of the water are operated by the governor at the same time as the regulating devices of the turbine.

As such operation has to be carried out quickly in order to prevent considerable fluctuations of the number of revolutions of the turbines, the regulating machinery must be powerful and expensive to be quick acting, and very complicated pressure relief apparatus is required in order to prevent the occurrence of a sudden and great increase in pressure in the conduit upon a sudden decrease in the load. These control apparatuses together with the auxiliary relief apparatus are often more expensive than the turbines themselves, particularly with medium and small size installations.

I have discovered that the control will be more sure, more easily effected and more readily attained at a greatly decreased cost if the effective head in the turbine be decreased or changed upon a decrease or change of load. This change of the effective head is carried out without causing an increase or decrease of the actual head, and the means for carrying it out comprise a controlling device adjusted by a governor responsive to a change of speed, voltage or frequency, in case the turbine drives electrical machinery. The area of the nozzles or the guide vanes is not adjusted to counteract load variations, and the turbines regulated according to the novel method need not even be provided with adjustable guide vanes. An adjustment of the guide vanes of the turbine may only be carried out to adapt the turbines of an installation to the periodically occurring alterations in the quantity of water carried in the river. As this alteration in the quantity of water takes place only at comparatively long intervals, the adjustment of the guide vanes or needles of nozzles may be effected by hand. In this manner a differentiation is made between the regulation upon a change of load, and the regulation upon a change in the available water.

The adjustment of the guide blades or needles of the nozzles which is carried out independently of the load variation may be effected slowly, and it therefore requires much less power than the hitherto employed regulating methods, in which the adjustment has to be performed very quickly upon load variations. Further, there may be but a single diverting means for a set containing any number of turbines or wheels supplied from a single pipe or from a plurality of pipes, in which case an interconnection of the pipe or pipes, will have to be provided and the diverting means inserted in said interconnection.

Preferably the flow of the quantity of waste water that is unused in each case and is led off through an energy-destroyer is varied by the influence of a controlling member actuated upon a change of load, whereby an alteration of the head acting upon the turbine runner is effected without effecting a banking up of the water.

In water-power-stations having a plurality of turbines and a plurality of supply conduits, interconnections between said conduits may be arranged and a common energy destroyer diffusion valve may be provided so that a centralized regulation of the flow of water through the turbine can be effected when the load changes.

If the water-power-station regulated according to the aforementioned method is provided with a storage reservoir, the quantity of water overflowing when the highest water-level is exceeded may be utilized in order to effect an opening of the energy-destroyer whereby that volume of the water in excess is carried off independently of the alteration of the flow through the energy destroyer caused upon load variation.

The device for carrying out the method according to the invention comprises means influenced by a regulating organ that is actuated upon a variation of the load in order to effect a variable flow off of the quantity of water that is not utilized under the existing load conditions to an energy-destroyer and to attain thereby an alteration of the head acting upon the turbine runner without effecting a banking up of the water.

Preferably the device comprises a controlling organ that is preferably balanced against the inside pressure in the conduit, which organ is inserted between the supply conduit leading to the turbines and the energy destroyer, said controlling organ being so actuated by a regulating member on load variations occurring that it closes the flow of the water to the energy destroyer and simultaneously opens the flow of water to the turbines and vice-versa.

Other features of the invention are pointed out hereinafter.

Devices for carrying out the process according to the invention are illustrated in the accompanying drawings, in which:

Fig. 4 is a section through a modified construction of the device;

Fig. 5 illustrates diagrammatically the adaptation of the device shown in Fig. 4 to a medium pressure water-power-station;

Fig. 7 shows the arrangement of a hydro-electric station similar to that shown in Fig. 5, the energy destroyer discharging the surplus water from the storage in the manner shown in detail in Fig. 6. Fig. 8 is an elevation of the diffuser shown in plan view in Fig. 7.

Figure 1:
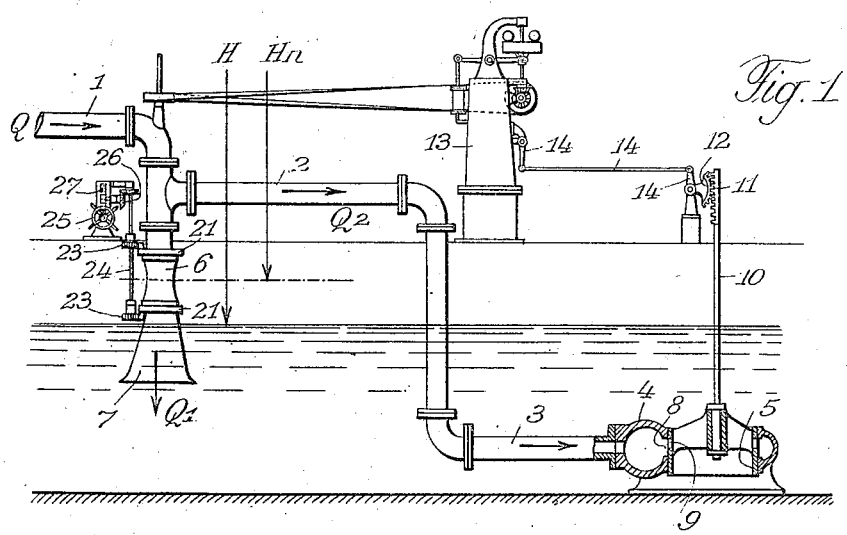
Fig. 1 is a diagrammatic sketch of a water-turbine installation provided with the regulating device according to the invention.

Referring to the regulating installation illustrated in Fig. 1, H denotes the normal head and $H^n$ the effective head above the turbine runner. 1 is the closed supply conduit to the turbine installation, 2 is a conduit that branches off the supply conduit 1 ahead of the turbine and ends in the waste conduit 3 to which the energy destroyer 4 with the controlling organ 5 is connected.

The casing 6 of the turbine is provided in the usual manner with a suction pipe 7. The energy destroyer 4 consists of a spiral casing having an inner cylindrical facing provided with a circular slot 8 through which the water from the waste pipe 3 can escape. The escape of the water from said port in controlled by the controlling organ 5 consisting of a cylindrical gate having a row of slots 9 along its circumference. The controlling organ 5 is adapted to be reciprocated in the vertical direction upon a variation of the load occurring. To this end the organ 5 is fixed to a rod 10, the upper end of which is shaped to form a toothed rack 11 that is in mesh with the toothed segment 12. The segment 12 is rotated from an automatic governor 13 through the interposition of a linkage 14 subsequent to a variation of the load on the turbine, the governor being actuated upon a variation of the speed of the turbine resulting by a variation of the load. The actuation of the governor causes the regulating organ 5 to be displaced in the vertical direction, whereby the row of slots 9 comes to register with the port 8 to a greater or less extent, and provides thus for a smaller or larger escape of the water. The total quantity of the water flowing in the supply pipe 1 is say Q, $Q^1$ is the quantity of water passing the turbine and $Q^2$ is the quantity escaping through the branch pipe 2 to the waste pipe 3 and the energy destroyer 4. When a flow of water is allowed to pass through the energy destroyer only part of the head is effective upon the turbine runner and, as the opening of the energy destroyer acts as a pressure relief, when the energy destroyer is full open and if the ports and conduits be suitably dimensioned only such an amount of the head may be effective on the turbine runner that is necessary to overcome the frictional resistance of the turbine running at no load. But in any case the sum of the quantities of water flowing through the turbine and the energy destroyer is always equal to the total quantity of water supplied, water hammer can therefore not occur in the supply pipe upon a variation in the load of the turbine as a load variation causes only a different distribution between the quantities flowing to the turbine and to the energy destroyer. The regulation of the flow of water through the turbine is thus effected by a variation of the effective head without causing the water to be momentarily banked up. The energy of the waste water is destroyed as the energy destroyer is placed in the tail water race, so that waste water will only cause whirls in the tail water race.

The controlling organ 5 may also be actuated in dependency upon variations in the voltage of a direct current generator driven by the turbine or in the frequency of alternating current generator.

Figure 2:
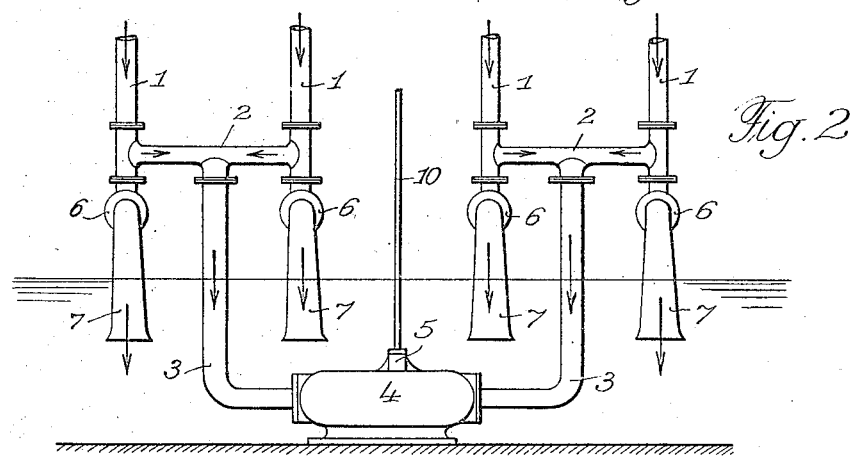
Fig. 2 shows in a diagrammatic manner an installation for regulating a plurality of turbines by one central regulating organ.

Fig. 2 of the drawing illustrates a regulation common to a plurality of turbines. Four conduits 1 each supply water to a turbine 6. The two pairs of the conduits 1 are interconnected by pipes 2, to each pipe being joined a waste water conduit 3 and the two waste water conduits 3 being connected to a single energy destroyer 4. In this manner all the four turbines are centrally regulated when the single energy destroyer 4 is actuated in the manner described above.

Figure 3:
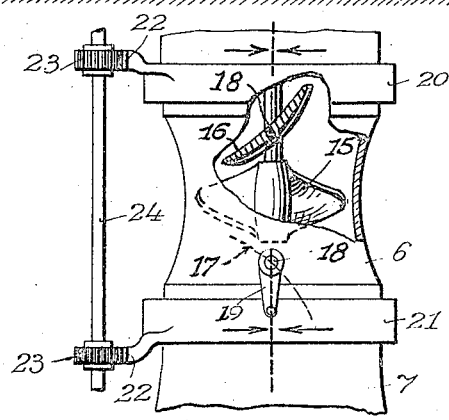
Fig. 3 is a detail of a turbine.

It will thus be seen that the regulation of one turbine Fig. 1 or of all turbines together Fig. 4 is always effected by actuating the controlling organ when a variation of the load occurs. However the turbines may be provided with adjustable guide vanes in order to provide for a working of the water masses on the runner blades that is free of shocks when the quantity of water available and carried in the supply pipes alters during comparatively long intervals. In this manner the hereby altered velocity of the vertical flow can be compensated by an alteration of the effective angle of the guide vanes. Fig. 3 shows a turbine that is provided with a device for altering the angle of the guide vanes when the water quantity carried by the supply pipe changes. 15 denotes the runner, 16 and 17 are the adjustable guide vanes. Each vane is mounted on a rod 18 to which a lever 19 is secured. The free ends of the levers 19 are connected to the upper and the lower regulating rings 20 and 21 respectively, which are turned by means of toothed segments 22 and pinions 23 meshing with the latter and cause thereby a turning motion of the vanes. The pinions 23 are fixed to a regulating shaft 24 which is actuated by a hand wheel 25 Fig. 1, through the interposition of a bevel gearing 26 and worm gearing 27.

A water-power-station comprising four turbines that are directly and centrally regulated upon a variation of the station load occurring by the controlling organ is illustrated in Fig. 4. In this figure 28 denotes the conduit supplying water to the station and 29 is the controlling organ consisting of a balanced piston valve slidably arranged inside the casing 30. The latter is provided with two annular spaces or channels 31 and 32, to the former there is connected the conduit 33 leading to the energy destroyer 34, a throttle valve 35 being inserted between the annular channel 31 and the conduit 33. To the other annular channel 32 the conduit 36 is connected which feeds the diagrammatically indicated turbines $t^1$, $t^2$, $t^3$, $t^4$. The piston valve 29 is rigidly secured to the piston rod 37 the latter being guided in bearings 38, 39 inside the casing 30 and the weight of the valve piston 29 is counterbalanced by a helical spring 40. Between the enlarged lower end 41 of the piston rod and a disc 42 on which the spring 40 presses, a cam or lever 43 in interposed that is fixed to the axle 44 turnably mounted in the casing 30. The turning motion of the lever 43 which serves to operate the piston valve 29 is effected by means of a small relay motor 45 in dependency upon the working conditions of the electrical side of the water-power-station. Thus in a manner known as such, the relay motor 45 may be caused to turn in a clockwise or in the anticlockwise direction respectively when the tension in a direct current-power-station or the frequency in an alternating current-power-station is respectively above or below the normal tension or frequency. The turning motion of the relay motor 45 is transmitted by means of a worm 46, worm-wheel 47 acting as a crank disc, connecting rod 48 and lever 49, the latter being fixed to the axle 44. When the cylinder valve 29, i. e., the controlling organ is thus operated, when a variation of the load occurs, it opens one of the annular channels for instance the channel 31 leading to the energy destroyer and closes simultaneously the other annular channel for instance the channel 32 leading to the turbines and vice versa. The annular channels 31 and 32 are shown to have the same height in the constructional example illustrated in Fig. 4, therefore the opening and simultaneous closing action of the piston valve will affect areas of the same size. The greater the quantity of water admitted to the energy destroyer the more the head or water pressure acting upon the turbine runner drops and the alterations in the output caused by this method of regulation is effected without causing the water to be banked up.

When the quantity of water carried in the supply conduit is subjected to alterations that last during comparatively long periods, an unnecessary loss of water by the energy destroyer may be prevented by closing the throttle valve 35 to some extent and by shutting down the number of turbines that is not required for utilizing the reduced quantity of the available water.

In order to prevent any dangerous water hammer occurring in case the above described regulation fails to work a pipe 50 may be provided branching off from the water supply conduit 28 and leading to the energy destroyer 34. In this branch pipe 50 a safety valve 51 is provided that is operated in dependency upon the pressure, for instance it may be electrically controlled.

The medium pressure water power plant illustrated in Fig. 5 comprises four turbines $t^1$, $t^2$, $t^3$ and $t^4$. The water is supplied to the power station by means of four conduits 52, 53, 54, and 55 all being connected up to a common distributing pipe 28. The regulating device illustrated in detail in Fig. 4 is joined to the pipe 28, the branch pipe leading to the energy destroyer 34 being designated with 33. 50 is the branch pipe acting as relief pipe when water hammer occurs through a failing of the regulating device. To the annular channel 31 of the casing of the regulating device the conduit 56 is connected from which the pipes 57, 58, 59 and 60 leading to the turbines $t^1$, $t^2$, $t^3$ and $t^4$ respectively branch off. The regulation of the whole station upon a variation of the load is carried out by the controlling organ of the regulating device being operated from a relay motor 45 as has been described above.

Figure 6:
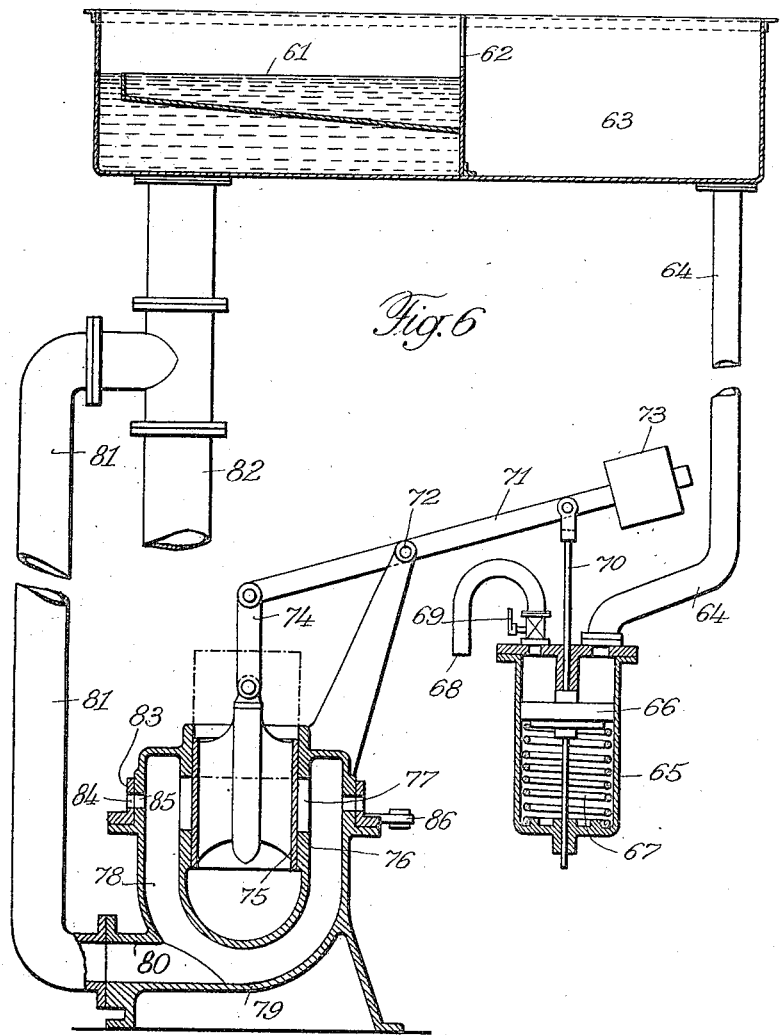
Fig. 6 shows a modified construction of a regulating device utilized with water-power-stations having storage reservoirs.

Fig. 6 of the accompanying drawings shows an installation in water-power-stations provided with the device for altering the flow of water through the turbines by an alteration of the head acting on the turbine runner, the station being supplied from a storage reservoir and the energy destroyer being also utilized for carrying off the highest quantity of water carried, that would overflow the storage basin. In this figure 61 denotes the head race or reservoir, from which water can flow over the crest 62 into the chamber 63. A conduit 64 is connected to said chamber and leads to an additional regulating member for influencing the energy destroyer. This regulating member consists of a cylinder 65 in which a piston 66 reciprocates that is acted upon on one side by a spring 67. At the same side of the piston to which the conduit 64 is connected a discharge pipe 68 is provided with a valve 69. The piston rod 70 is linked to a double armed lever 71, turnably mounted about the fulcrum pin 72 and carrying at one end a counterweight 73, the other end being connected to a link 74 that is connected to a piston valve 75 of the energy destroyer. The piston valve 75 is guided in a cylinder 76 having a ring of ports 77 that leads to the annular space 78 of the energy-destroyer, the casing 79 of which is connected to the conduit 81 which conduit is branched off from the conduit 82 leading from the head race or storage basin 61 to the power station. The turbines of the station are not shown in Fig. 6.

A regulating ring 83 having apertures 84 on its circumference is rotatably mounted on the casing 79; the apertures 84 of the ring 83 cooperating with apertures 85 in the casing 79 allow of water leaving the annular space 78 when the regulating ring 83 is turned more or less in accordance with a load variation whereby the apertures in ring and casing are brought more or less to register. A link 86 is shown by means of which the regulating ring 83 is actuated for instance from an oil pressure governor.

The operation of the device is as follows:
During normal working only the regulating ring 83 is actuated during load variations in dependency upon, for instance, the speed of the turbines. If now the quantity of water supplied to the head race or to the storage basin is in excess of the quantity of water flowing through the turbines and through the energy destroyer, which may occur when the quantity of the available water increases or when the regulating device fails to act, the water in the head race rises to the highest mark and flows over into the chamber 63 from where it flows through the conduit 64 in the cylinder 65. The static pressure of the water column inside the conduit 64 pushes the piston 66 against the action of the springs 67 in a downward direction, whereby the piston valve 75 is lifted by the intermediary of the links 70, 71, 74 so that the ports 77 are uncovered and allow of a quantity of water corresponding to the excess quantity supplied to the head race to escape. The valve 69 of the discharge pipe 68 is opened to some extent so that the water in the conduit 64 can escape whereupon the static pressure in said conduit disappears as soon as there is no further water flowing into the chamber 63 and the spring 67 causes thereupon the piston 75 to return into its initial position.

With the novel method and the devices according to the invention the hitherto stipulated requirement of a uniform best efficiency of the turbines working under any load is no longer considered as this requirement is not justified for all the regulating conditions in which the water available is not wholly utilized. When a variation of the load occurs the efficiency of the turbines is of no importance as soon as part of the water flows through a waste channel or through an energy destroyer. The tendency to attain best figures of the efficiency is only justified when the total quantity of the available water is utilized and particularly in times of the shortage of water. As a change of the water carried cannot be ascertained during periods of seconds but, in contradistinction to the variations of the load and the generation of the current caused thereby, takes place during hours and days, it suffices when the regulation of movable regulating parts of a turbine, for instance of movable guide vanes, circular gate and the like with reaction turbines, or of needles, tongues and the like with free jet turbines is carried out not in dependency upon the speed, as has been hitherto the case, but only in dependency upon the quantity of water available for utilization.

Thereby it is attained that all the numerous turbine governors of a water-power-station of the hitherto known type can be replaced by one governor common to all the turbines, and instead of a considerable amount of work involved by all the single governors only a small amount of regulation work of the one governor has to be taken into account. Further in some cases the costs of an automatic oil pressure governor even exceeds the costs of a turbine, the saving in the initial costs of a power station regulated according to the present method is therefore very considerable. Furthermore the continuous flow of the total quantity of the water through the supply pipes and from there to the turbines and to the energy destroyer avoids any shocks or water hammer in the said supply pipes when a sudden change of load occurs, the supply pipes need therefore not be dimensioned to withstand possible pressure rises and they will be considerably cheaper than pipes designed in accordance with the hitherto known principle and their factor of safety will become higher. With water-power-plants in which no provision is made for storing the water not utilized the arrangements for dealing with the waste water may be done away with as the superfluous water can be carried away through the supply pipes. This instance means again sometimes a considerable saving in the costs for building the station.

I claim:

1. A method of regulating the flow of water through water-power stations having enclosed water-supply conduits supplying water to the runners of the water wheels thereof; comprising regulating the flow of water through the turbine upon a variation of the load solely by the step of varying the effective head acting on the runner without causing an increase or decrease in the actual head in said conduits.

2. A method of regulating the flow of water through water-power stations having enclosed water-supply conduits supplying water to the runners of the turbines thereof; which comprises diverting the flow of water flowing to the turbine to decrease the effective head thereon upon a variation of load conditions on the turbine without changing the actual head, and adjusting the turbine guides only for change in available quantity of water.

3. A method of regulating the flow of water through water-power stations having an enclosed water-supply conduit supplying water to the runners of a plurality of turbines; which comprises changing the effective head in such conduit common to all the turbines upon a variation of load conditions without changing the actual head.

4. A method of regulating the flow of water through water-power stations having a main supply pipe and a plurality of turbines supplied from branches of said pipe; which comprises changing the effective head in such pipe upon variation of load conditions by diverting the water from said pipe ahead of the turbines without changing the actual head on the turbines, and only adjusting the turbine guide vanes upon an alteration in the available water supply.

5. A method of operating water power stations having a pipe supplying at least one turbine; which comprises maintaining a passage through the station of a substantially constant quantity of water, varying the effective head on the turbine by diverting water from said pipe at the station before it reaches the turbine, by variation of the load on the turbine, and thereafter adjusting the turbine only upon an alteration in the available quantity of water.

6. The method of operating water-power turbine plants, which comprises maintaining the supply of water at the turbine unthrottled under varying load conditions, controlling the turbine solely by partially diverting the water supply from said turbines and thereby maintaining a constant head on said turbines, and automatically and additionally controlling such diversion in accordance with the level of the available water.

7. In a water-power plant having at least one turbine or water-wheel and at least one supply-pipe or closed conduit; means to divert water from said pipe or conduit, and means operated upon a change of load to solely control said diversion.

8. In a water-power plant having at least one turbine or water wheel and at least one supply pipe or closed conduit; means to divert water from said supply pipe, means operated upon a change of load to control said diversion and thereby change the effective head, and means operated independently of the diversion-controlling means to adjust the turbine to operate under change in the supply of available water.

9. In a water-power plant having a plurality of turbines and at least one supply pipe, means to divert the water supplied, and means common to all the turbines and operated upon a change in load conditions to control said diversion.

10. In a water-power plant having a plurality of turbines and at least one supply pipe, means to divert the water supplied, means common to all the turbines and operated upon a change in load conditions to control said diversion and thereby change the effective head, and separate means to adjust said turbines only upon a change in the available quantity of water.

11. In a water-power station having at least one turbine and a supply pipe therefor; means to divert water from said pipe, a valve controlling such diversion, means to actuate said valve upon a change of load on the turbine and thereby change the effective head on the turbine and means operated by an increase in the actual head to increase the quantity of water diverted through said diverting means.

12. In a water power station having a plurality of turbines, a pipe to supply water to said turbines, a main diverting valve controlling the water to the turbines, means to actuate said valve upon a change of load on said turbines and thereby change the effective head, a diverting pipe connected to the first pipe at a point ahead of said valve, a diffusing valve on said diverting pipe and means operated by a change in the actual head of water to operate said diffusing valve.

13. In a water power station having a plurality of turbines, a supply pipe therefor, a valve in said supply pipe controlling the water to the turbines, mechanism for operating said valve upon a change of load on the turbines, a diversion pipe connected to the first pipe at a point ahead of said valve, a regulatable diffusing valve on the diversion pipe controlling the diverted water and mechanism operated by the actual head of water to additionally control said diffusion valve.

In testimony that I claim the foregoing as my invention I have signed my name.

OSKAR POEBING.